United States Patent [19]

Lynch

[11] Patent Number: 5,114,481
[45] Date of Patent: May 19, 1992

[54] AEROSOL-TYPE, SPRAYABLE, WATER-IN-LIQUID HYDROCARBON MULTICOLOR PAINT AND PROCESS FOR MAKING

[75] Inventor: James F. Lynch, Schaumburg, Ill.

[73] Assignee: Multicolor Specialties, Inc., Cicero, Ill.

[21] Appl. No.: 586,342

[22] Filed: Sep. 21, 1990

[51] Int. Cl.$^5$ .............................................. C09D 5/29
[52] U.S. Cl. ......................... 106/170; 106/24; 106/26; 106/124; 106/163.1; 106/191; 106/253; 106/311
[58] Field of Search ................ 106/170, 191, 253, 124, 106/163.1, 311, 24, 26

[56] References Cited

U.S. PATENT DOCUMENTS

| | | |
|---|---|---|
| 3,370,024 | 2/1968 | Grasko et al. ..................... 106/170 |
| 3,811,904 | 5/1974 | Zola .................................. 106/253 |
| 3,852,076 | 12/1974 | Grasko et al. ..................... 106/170 |
| 3,950,283 | 4/1976 | Sellars et al. ...................... 106/170 |
| 4,376,654 | 3/1983 | Zola .................................. 106/170 |

*Primary Examiner*—William R. Dixon, Jr.
*Assistant Examiner*—Scott L. Hertzog
*Attorney, Agent, or Firm*—Olson & Hierl

[57] ABSTRACT

A water-in-liquid hydrocarbon multicolored paint composition is provided having a disperse phase and a continuous phase. The disperse phase preferably is comprised of water soluble, film-forming, crosslinkable, carboxylated polymer; crosslinking agent; hydroxy (lower alkyl) cellulose; cationic quaternized water soluble cellulose ether; peptized clay and water. The continuous phase preferably is a hydrocarbon composition containing film-forming polymer, wax and thickener. Methods for preparing the paint are also provided.

16 Claims, 1 Drawing Sheet

AEROSOL-TYPE, SPRAYABLE, WATER-IN-LIQUID HYDROCARBON MULTICOLOR PAINT AND PROCESS FOR MAKING

FIELD OF THE INVENTION

The present invention is directed to water-in-liquid hydrocarbon multicolor paint which, when compounded with a propellant, atomized into an aerosol-type spray, and applied as a surface coating and dried, produces a coated surface having excellent characteristics, particularly water resistance.

BACKGROUND OF THE INVENTION

Multicolor paint is a paint which, when coated on a surface and dried, results in a coating that is characterized by dispersed discrete spots (or dots). Water-in-liquid hydrocarbon aerosol-type multicolor paints have previously been proposed; for example, see Grasko U.S. Pat. No. 3,370,024.

Manufacture of such an aerosol-type multicolor paint is difficult to accomplish. One problem is that the paint must be formulated with a propellant of the low molecular weight family of fluorocarbons, chlorofluorocarbons and hydrocarbons, stored, and then atomized from a valved container as an aerosol-type spray to produce a coating that, after drying, has excellent visual characteristics. Such a formulation must contain discrete color bodies that are not adversely affected by the propellant or the spraying. Solvent action by the propellant upon the individual color bodies can adversely effect the color bodies.

Another problem is to produce a paint which can be applied as an aerosol and then dried to produce a coating that has excellent water resistance. A resinous film-forming polymeric material which is sufficiently water soluble, paint system compatible, coatable and dryable to produce a water-resistant coating has not previously been available. As those skilled in the art will appreciate, in order to achieve water resistant color spots in a multicolor painted, coated and dried surface, each individual color spot must not only be pigmented, but must also be infused with a significant amount of a water resistant or insoluble resinous film-forming material; otherwise, the resulting dried coated surface is subject to attack upon exposure to water.

In the prior art, to achieve water resistance, it was common to overcoat a multicolor coating produced from an aerosol spray with an overcoating of a clear polymeric material, such as a lacquer or the like.

So far as now known, no one has heretofore succeeded in producing a multicolor water-in-liquid hydrocarbon paint which is compoundable with a propellant, sprayable as an aerosol, and thereafter dryable to produce a uniform multicolor coating with excellent water resistance characteristics.

SUMMARY OF THE INVENTION

The present invention provides a water-in-liquid hydrocarbon multicolor paint and a process for the preparation of the multicolor paint. The paint can be formulated with a propellant to produce a storable composition that can subsequently be atomized from an aerosol-type spray container through a valve to form a multicolor paint coating.

The present invention further provides improved multicolor coatings produced from the application and drying of such a paint whether or not the paint is formulated with a propellant. The resulting coatings display excellent water resistance and other desirable characteristics.

The multicolor paint has a continuous phase and a disperse phase. The bodies comprising the disperse phase are aqueous and incorporate a mixture of dissolved polymeric materials comprised of:

(a) water-dispersable, film-forming, crosslinkable, carboxylated polymer, and (b) hydroxy (lower alkyl) cellulose and/or alkali metal carboxy (lower alkyl) cellulose.

Also present in the disperse phase bodies is a crosslinking agent for the crosslinkable polymer which agent is selected from the class consisting of multifunctional carbodiimides and polyfunctional aziridines. Also, at least one pigment is optionally but preferably present in at least some of the disperse phase bodies.

In addition, the disperse phase bodies include at least one material comprising either a cationic quaternized cellulose ether, or an aqueous gel that is itself comprised of a water swellable clay, a peptizing agent and water. Preferably both of the foregoing materials are present. When an aqueous gel is present, the water swellable clay is preferably a synthetic hectorite clay and the peptizing agent is preferably tetrasodium pyrophosphate. These agents not only thicken, but also improve the structural integrity of the disperse phase bodies.

Optionally, but preferably, also present in the disperse phase bodies are one or more of the conventional paint additives, including plasticizers, silicone bonding agents, antifoaming agents, wetting agents, and/or the like.

The disperse phase bodies are dispersed in a continuous liquid hydrocarbon phase. The continuous phase is a homogeneous composition which comprises hydrocarbon having dispersed therein a film-forming polymer and, if additionally necessary, a sufficient amount of thickener to cause the resulting composition to have a viscosity of about 1500 centipoises (cps) as measured with a Brookfield viscometer at 25 degrees Centigrade (C.) using a No. 4 spindle operating at 20 rpm.

The film-forming polymer used in the continuous phase is hydrocarbon dispersable and preferably water non-dispersable but compatible with the carboxylic polymer employed in the aqueous disperse phase compositions. Such a polymer is typically one or more of the various polymers heretofore known in the paint art for use in combination with hydrocarbon liquid carriers for comprising a paint vehicle (that is, a combination of polymeric film-forming binder and liquid carrier). Characteristically, these polymers have little or no solubility, or even colloidal suspendability, in water.

Preferably, the continuous phase hydrocarbon composition additionally contains a wax and a pigment. Also, one or more of the conventional paint additives such as indicated above is preferably also present in the continuous phase.

An outstanding feature of a multicolored water-in-liquid hydrocarbon paint of this invention is that the paint is formulatable with a conventional propellant. Such a propellant is dissolved in the continuous liquid hydrocarbon phase of a multicolor paint of this invention in an amount sufficient to be effective for use in producing an aerosol-type multicolor paint which is sprayable from a valve-equipped aerosol container. The disperse phase aqueous bodies remain stable in the presence of the dissolved propellant during storage and spraying. Evidently, the propellant does not become sufficiently dissolved in the disperse phase bodies to cause any adverse effect upon the structure or composition thereof. Thus, surprisingly, the resulting propellant-containing formulations display excellent shelf life characteristics and aerosol sprayability characteristics.

Also surprisingly, when a multicolor paint of this invention, whether or not formulated with a propellant, is applied as a coating over a surface and dried, there results a product multicolor coating which has surprisingly good water resistance characteristics compared to all known comparable multicolor prior art formulations.

The water-in-liquid hydrocarbon multicolor paints, the formulations thereof with propellant, and the dried, coated surfaces such as are produced by application thereof, have never previously been known with the foregoing combination of properties.

Other and further objects, purposes, features, advantages, embodiments and the like will be apparent to those skilled in the art from the present specification taken with the appended claims.

BRIEF DESCRIPTION OF THE DRAWING

In the drawing, a flow sheet is shown illustrating blending sequences suitable for use in practicing the present invention.

DETAILED DESCRIPTION (a) Definitions

The term "water dispersable" or equivalent as used herein with reference, for example, to a carboxylated polymer or cross-linking agent, or similar material, means that such a material can form a water solution or a colloidal suspension in water. However, to enhance the water dispersability of such a material, and to increase the amount of the material which is present in a water dispersed form in the disperse phase of a multicolor paint of this invention, the water is preferably admixed with a water miscible organic liquid, such as hereinafter characterized and illustrated, wherein, for example, the carboxylated polymer or other disperse phase component material, is at least as dispersable as in water. Preferably, such a polymer or other material is characterized by a capacity to disperse in water-miscible organic solvents to an extent similar to that of the material dispersability in water alone.

Similarly, the term "hydrocarbon dispersable" or equivalent as used herein with reference to a film-forming polymer, thickener, wax or like continuous phase component material means that the material can form a solution or colloidal suspension in a hydrocarbon such as used in the continuous phase of multicolor paint of this invention.

The term "cross-linkable" as used herein with reference to a water dispersable carboxylated polymer means that such a polymer, after being applied to a surface from an aqueous coating composition and allowed to form a film or coating, crosslinks and becomes water insoluble through reaction with a water dispersable crosslinking agent which is also present in the aqueous coating composition. The cross-linking occurs preferably during the drying which takes place after the aqueous coating composition of the polymer and the cross-linking agent are applied as a coating to the surface and the aqueous carrier of the coating composition is evaporated. Also, the crosslinking preferably occurs at ambient temperatures and pressures, although heat may be used to accelerate the drying and crosslinking reaction.

The term "storage stability" as used herein with reference to a multicolor paint of this invention means that the paint passes the test procedure of ASTM D-1849-80 which test relates to package stability of paint stored in a 1 quart, or 1 liter, container at $125 \pm 2°$ F. ($52 \pm 1°$ C.) for 1 month, or 2 months, respectively, as regards consistency and settling.

The term "structural integrity" as used herein in relation to a multicolor paint and the disperse phase bodies therein refers to the ability of the disperse phase bodies therein to remain stable and substantially unchanged when subjected at ambient temperature and pressure to a shear mixing force exerted by a Cowles mixing blade operating at about 450 to about 500 rpm.

As used herein, the term "water resistance" as used herein with reference to a coated and dried film or coating produced from a multicolor paint of this invention has reference to the test procedure of ASTM D-1308-79 with regard to both covered and open spot tests.

The term "paint" is used herein in the broad sense of a coloring and coatable substance for spreading as a coating on a surface.

The term "gel" as used herein, particularly in relation to the disperse phase bodies of a multicolor paint or formulation thereof with a propellant, has reference to a colloid in which the disperse phase has combined with the continuous phase to produce a viscous, jelly-like product.

The term "KB" or "KB value" as used herein with reference to a liquid hydrocarbon or the like means the volume in milliliters at $25°$ C. ($77°$ F.) of a solvent, corrected to a defined standard, required to produce a defined degree of turbidity when added to 20 grams of a standard solution of kauri resin in normal butyl alcohol. For kauri-butanol values of 60 and over, the standard is toluene and has an assigned value of 105. For kauri-butanol values under 60, the standard is a blend of 75 percent n-heptane and 25 percent toluene and has an assigned value of 40 . (ASTM)

(b) Starting Materials

The water dispersable, film-forming, crosslinkable, carboxylated polymers which are employed as starting materials in the practice of this invention are generally known in the prior art and do not as such constitute part of the present invention. Some examples of these polymers are shown in Table I below. Typically and preferably, such a polymer contains at least about 2 weight percent of carboxyl groups on a 100 weight percent total polymer weight basis, and more preferably at least about 3 weight percent. Preferably, such a polymer does not contain more than about 7 weight percent of carboxyl groups (same basis).

TABLE I

CROSS LINKABLE, WATER SOLUBLE, FILM FORMING POLYMERS

| Ident. No. | Chemical Name | Trade Name/ Trade Mark | Manufacturer/ Source |
|---|---|---|---|
| 1. | Carboxylated Styrene Acrylate Copolymer | "Pliolite" 7103 & 7104 | Goodyear |
| 2. | Carboxy-Modified Acrylic | "Mycar" 26171 | B. F. Goodrich |
| 3. | Carboxy-Modified Acrylic | "Mycar" 26137 | B. F. Goodrich |
| 4. | Carboxy-Modified Acrylic | "Mycar" 26322 | B. F. Goodrich |
| 5. | Carboxy-Modified Acrylic | "Mycar" 26083 | B. F. Goodrich |
| 6. | Carboxy-Modified Acrylic | "Mycar" 26092 | B. F. Goodrich |
| 7. | Carboxy-Modified Acrylic | "Mycar" 2671 | B. F. Goodrich |
| 8. | Carboxy-Modified Acrylic | "Mycar" 26796 | B. F. Goodrich |
| 9. | Carboxy-Modified Acrylic | "Mycar" 26084 | B. F. Goodrich |
| 10. | Carboxy-Modified Acrylic | "Mycar" 26091 | B. F. Goodrich |
| 11. | Carboxy-Modified Acrylic | "Mycar" 26288 | B. F. Goodrich |
| 12. | Carboxy-Modified Acrylic | "Mycar" 26106 | B. F. Goodrich |
| 13. | Carboxy-Modified Acrylic | "Mycar" 26172 | B. F. Goodrich |
| 14. | Carboxy-Modified Vinyl Chloride | "Geon" 460x6 | B. F. Goodrich |
| 15. | Carboxy-Modified Vinyl Chloride | "Geon" 460x45 | B. F. Goodrich |
| 16. | Carboxy-Modified Vinyl Chloride | "Geon" 460x46 | B. F. Goodrich |
| 17. | Carboxy-Modified Vinylidene Copolymer | "Geon" 450x61 | B. F. Goodrich |
| 18. | Carboxy-Modified High Acrylonitrile | "Mycar" 1571 | B. F. Goodrich |
| 19. | Carboxy-Modified Special Acrylonitrile | "Mycar" 1570x55 | B. F. Goodrich |
| 20. | Carboxy-Modified Special Acrylonitrile | "Mycar" 1572 | B. F. Goodrich |
| 21. | Carboxy-Modified Special Acrylonitrile | "Mycar" 1578 | B. F. Goodrich |
| 22. | Carboxy-Modified Styrene Butadiene | "Goodrite" 257ox59 | B. F. Goodrich |
| 23. | Carboxy-Modified Vinyl Acetate | "Polyco" 2149c | Borden |
| 24. | Carboxy-Modified Vinyl Acetate | "Polyco" 2142 | Borden |
| 25. | Carboxy-Modified Styrene Butadiene | "Derex" 5101 | W. R. Grace |
| 26. | Carboxy-Modified Styrene Butadiene | "Derex" 5261 | W. R. Grace |

As indicated above, a carboxylated styrene acrylate copolymer is the presently preferred carboxylated polymer type for employment in the practice of the present invention. For example, the product available from Goodyear under the trademark "Pliolite" 7103 and 7104 apparently contains about 65 percent by weight styrene and about 35% by weight of butyl acrylate and is carboxylated to an extent sufficient to contain about 3 to 4 weight percent carboxyl groups on a 100 weight percent total polymer weight basis.

Such a polymer, for example, can be comprised of about 50 to about 75 weight percent styrene and correspondingly about 25 to about 50 weight percent of at least one (lower alkyl) acrylate monomer on a total polymer weight basis. The acrylate monomer is preferably n-butyl acrylate. Such a polymer is characterized by the feature that, after its formation, it contains pendant carboxylic functional groups which are reactive with a multifunctional carbodiimide or with a polyfunctional aziridine to produce a cross-linked, water-insoluble product. The molecular weight of the starting polymer is low enough to permit the polymer to be water dispersable.

The hydroxy (lower alkyl) cellulose materials employed in the practice of this invention as starting materials are generally known in the prior art and do not as such constitute a part of the present invention. As used herein, the term "lower alkyl" generally refers to an alkyl moiety containing from (and including) one through four carbon atoms. Presently most preferred as a cellulose type additive material for use in this invention is hydroxyethyl cellulose, which is available commercially under the trademark "Cellosize" from the Union Carbide Chemicals Company. Such a material is a nonionic, water-soluble cellulose ether which is believed to be interactive with peptized water swellable clays in aqueous gels, thereby aiding in the formation and maintenance of the disperse phase bodies in a multicolor paint composition of this invention. Hydroxypropyl cellulose is also useful, for example.

The alkali metal carboxy (lower alkyl) cellulose materials employed in the practice of this invention as starting materials are generally known to the prior art and do not as such constitute a part of the present invention. Presently a most preferred alkali metal carboxy (lower alkyl) cellulose is sodium carboxy methyl cellulose. One such material is available commercially as "CMC-7-7H3SF" from the Aqualon Company.

The cationic quaternized cellulose materials employed in the practice of this invention as starting materials are also generally known in the prior art. These polymeric materials are available commercially, for example, from Union Carbide Corporation under the trademark "Polymer JR" or "UCARE Polymer" in a variety of viscosity grades. These materials are also known as, and designated by, the CTFA (that is, the Cosmetic, Toiletry and Fragrance Association, Inc.) as "Polyquaternium-10" which is defined as a polymeric quaternary ammonium salt of hydroxyethyl cellulose that has been reacted with a trimethyl ammonium substituted epoxide. Such a cationic, water-soluble cellulose ether is theorized to be interactive with at least one other component present in the disperse phase bodies employed in a paint of the present invention; however, the nature of this interreaction is not now known.

The pigment employed in the practice of this invention as a starting material can be selected from among the various pigments known in the prior art. Preferably, the pigment is in the form of dispersible particles having ultimate particle sizes in the submicron range. The pigment should preferably also be substantially insoluble in water or in organic solvents. While a pigment should have a positive colorant value, it can be organic, inorganic, or a mixture of organic and inorganic materials. If desired, as those skilled in the art will appreciate, the pigment can be prepared preliminarily as a slurry, dispersion, or the like in water and/or organic liquid for purposes of simple mechanical blendability. Presently preferred pigments include, for example, titanium dioxide; lamp black; carbon black; bone black; phthalocyanine blue; phthalocyanine green; various organic and inorganic yellow pigments, such as, for example, D & C yellows including quinoline yellow, yellow iron oxide, and the like; various organic and inorganic red pigments, such as, for example, D & C reds including quinacridone red and red iron oxide, respectively, and the like; etc. Dyes can also be used.

The dispersible, water swellable clays employed in the practice of this invention can be selected from among the various known such clays, both natural and synthetic. Preferably, the clay selected is a silicate which has an ultimate particle size in the submicron range. Examples of suitable clays include synthetic silicate clays resembling hectorite and/or saponite, montmorillonite, beidellite, nontronite, sauconite, stevensite, smectite and other inorganic minerals which are characterized by a tendency to swell by absorbing water between adjacent crystal layers, and to split into charged fragments capable of forming colloidal dispersions. A presently most preferred silicate clay is a synthetic sodium magnesium lithium silicate hectorite-type clay. This material is obtainable commercially from Waverly Mineral Products of Balacynwyd, Pa. which is a subsidiary of La Porte Inc. of the United Kingdom under the trademark designation "Laponite" RD or RDS. Other suitable hectorite clays are available commercially from the R. T. Vanderfilt Company under the trademark "Veegum T", or from the Baroid Div., National Lead Company under the trademark "Macaloid".

The above described clays ar employed in the practice of this invention in combination with a water soluble peptizing agent. Such an agent induces the clay to form a stable colloidal aqueous dispersion. Use of such an agent is conventional with such clays. Examples of known water soluble peptizing agents include ammonium hydroxide, hydrogen peroxide, sodium carbonate, sodium citrate, sodium hydroxide, sodium oxalate, sodium silicate, sodium tripolyphosphate, sodium hexametaphosphate, tetrasodium pyrophosphate, and the like. The last named peptizing material is presently preferred for use in the practice of this invention.

The multicolor paint compositions of this invention contain in the disperse phase a crosslinking agent which is effective for crosslinking the carboxylated crosslinkable polymers involved. Suitable water dispersable crosslinking agents for use in this invention which can interreact with such polymers at ambient temperatures and pressures are preferably polyfunctional aziridines and multifunctional carbodiimides (the latter class being presently preferred). Such materials are known in the prior art and are available commercially. These materials as such do not form a part of the present invention.

Carbodiimides (sometimes also called cyanamides) are a well-known class of organic compounds believed to have the general structure:

where $R_1$ and $R_2$ are each an organic moiety. Carbodiimides crosslink with carboxylic acid groups to form N-acyl ureas.

A presently preferred carbodiimide is available commercially from Union Carbide under the trademark "UCARLNK XL-25 SE" which is designated as "multifunctional" and is designed for use as a low-temperature crosslinking agent for polymers such as carboxylated polymers.

Aziridines are organic compounds based on the ring structure:

A presently preferred crosslinking polyfunctional aziridine is "ZAMA-7" which is designated "polyfunctional" and is available commercially from Hoechst Celanese and also from Virginia Chemicals. This material also is designed for use as a low-temperature crosslinking agent for polymers such as carboxylated polymers.

The disperse phase bodies in a multicolor paint of this invention preferably incorporate a water-miscible organic liquid as a co-solvent in combination with the water employed therein. Any convenient water miscible organic liquid can be used, but presently preferred such liquids include ester alcohols, such as the material available commercially from Eastman Kodak Company under the trademark "Texanol"; glycol ethers, such as diethylene glycol butyl ether, which is available from Union Carbide Corporation under the trademark "Butyl Carbitol"; and ethylene glycol butyl ether, which is available from Union Carbide Corporation under the trademark "Butyl Cellosolve"; and the like.

The liquid hydrocarbon employed in the continuous phase of a paint of this invention is substantially water immiscible. Aliphatic hydrocarbons having KB values between about 36 and about 80, or aromatic hydrocarbons having KB values between about 80 and about 105 are suitable. Mixtures of such hydrocarbons can be used, if desired. Aliphatic hydrocarbons are presently preferred.

The propellants employed in the practice of this invention can be any of the known low molecular weight family of fluorocarbons, chlorocarbons, chlorofluorocarbons, or hydrocarbons which are gaseous at room (ambient) temperatures and pressures. Aliphatic hydrocarbons are presently preferred, such as the presently preferred formulation known as "A-70" which is believed to comprise a 1:1 weight ratio of propane to isobutane that is available from Phillips Chemical, a Division of Phillips Petroleum, and has a vapor pressure of 75.69 psig at 70° F.

(c) Preparation of Blending Compositions

It is convenient and presently preferred to prepare three compositions initially, which are designated, respectively, as "Composition A", "Composition B" and "Composition C", each of which is described below.

Composition A

Composition A is conveniently prepared by preliminarily dissolving the water dispersable, film-forming, crosslinkable carboxylated polymer and the hydroxy (lower alkyl) cellulose in a water/cosolvent mixture. Thereafter, the pigment when used is conveniently dispersed in the resulting mixed solution.

Typically, but preferably, Composition A also includes various optional additives of the type conventionally used in paint formulations, such as plasticizers, bonding agents, antifoaming agents, wetting agents, fungicides, neutralizers and the like. It can be regarded as a feature of the present invention that such additives can be used effectively in a multicolor paint of this invention and can achieve their respective known effects without adversely affecting such desirable paint properties as formulatability, storage stability, applied dried coating water resistance, disperse phase body structural integrity, or the like.

Examples of suitable plasticizers preferably include monomeric plasticizers, such as phthalates like dibutyl phthalate, diisodecyl phthalate, dioctyl phthalate, tricresyl phosphate, butyl benzyl phthalate, and the like. Other suitable monomeric plasticizers can be selected from among the adipates, sebacates, glycolates, castor oils, and the like.

Examples of suitable bonding agents include epoxidized siloxanes, such as a glycidyl silane like glycidoxy trimethoxy silane, and the like.

Examples of suitable antifoaming agents include the materials available commercially from Henkel under the trademarks "Foamaster VL", "Dehydran 1293", "Nopco" NXZ and the like.

Examples of suitable wetting agents include polycarboxylic acid salts such as are available from Rohm and Haas under the trademark "Tamol" 165 and also the materials that are available commercially from Rohm and Haas under the trademark "Triton", especially the products CF10 and X100.

If desired, one can additionally incorporate into a Composition A an amount (preferably less than about 50 weight percent on a total Composition A weight basis) of a film-forming water dispersable polymer which is compatible with the carboxylated copolymer, preferably an emulsion polymer, for purposes of carboxylated polymer extension, or the like. Examples of suitable such polymers include:
1) aliphatic urethane;
2) aromatic urethane;
3) acrylic polymers and copolymers;
4) vinyl acrylic copolymer;
5) vinyl acetate copolymer
6) mixture of vinyl acetate and acrylic polymers;
7) styrene/acrylic copolymer;
8) polyvinyl pyrrolidone;
9) polyvinyl alcohol;
10) polyvinyl chloride;
11) alkyd emulsions;
12) epoxy emulsions;
mixtures thereof, and the like. Such an incorporation can be accomplished by conventional mechanical blending procedures.

The preferred compositional characteristics of a Composition A are shown in Table II below:

TABLE II

COMPOSITION A

| Ident. No. | Component | Weight Percent 100 basis wt. % Broad (about) | Preferred (about) |
|---|---|---|---|
| 1 | Carboxylated Polymer | 10–40% | 14–16% |
| 2 | Hydroxy (alkyl) cellulose | 0.5–2.0% | 0.75–1.25% |
| 3 | Cross linking agent | 0.5–10% | 5–6% |
| 4 | Water | 3–50% | 65.80–44.40% |
| 5 | Organic cosolvent | 0–10% | 8–99% |
| 6 | Pigment | 0–30% | 5–20% |
| 7 | Monomeric plasticizer | 0–3% | 1–2% |
| 8 | Bonding agent | 0–.50% | 0.10–0.30% |
| 9 | Antifoaming agent | 0–.50% | 0.10–0.30% |
| 10 | Wetting agent | 0–1.00% | 0.25–0.75% |
| | (Total) | (100.00) | (100.00) |

Characteristically, Composition A preferably has a viscosity that is believed to be in the range of about 15,000 cps to about 25,000 cps (centipoises) measured with a Brookfield viscometer at 25° C. operating at 20 rpm spindle speed with a No. 4 spindle.

Preferably the water employed in the practice of this invention is filtered and is either deionized or distilled. A present preference is to employ a water and organic water miscible cosolvent medium comprised of about 85 to about 90 weight percent water with the balance up to 100 weight percent on a total solvent composition weight basis thereof being the cosolvent (as above characterized).

Composition B

Composition B is prepared by dissolving the cationic quaternized cellulose ether in water. The preferred compositional characteristics of Composition B are identified in Table III:

TABLE III

COMPOSITION B

| | | Weight Percent (100% Basis) | |
|---|---|---|---|
| ID# | Component | Broad Range | Presently Most Preferred |
| 1 | Water | 95–99.5 | 98.00 |
| 2 | Cationic quaternized cellulose ether | 0.5–5 | 2.00 |
| | (Total) | (100.00) | (100.00) |

Characteristically, Composition B preferably has a viscosity that is believed to be in the range of about 50,000 to about 55,000 centipoises measured at 25° C. with a Brookfield viscometer using a No. 4 spindle operating at a spindle speed of 20 rpm.

Composition C

Composition C is prepared by dissolving a peptizing agent in water and then dispersing a water swellable clay in the resulting solution. In general, the respective amount employed of each material is such that the resulting aqueous system forms a gel. As indicated above, the presently most preferred clay is a synthetic sodium magnesium lithium hectorite clay, and the presently most preferred peptizing agent is tetrasodium pyrophosphate. Composition C is preferably characterized as shown in Table IV:

TABLE IV

COMPOSITION C

| | | Weight Percent (100% Basis) | |
|---|---|---|---|
| ID# | Component | Broad Range | Presently Most Preferred |
| 1 | Water | 88–95% | 89.40 |
| 2 | Clay | 5–10% | 9.50 |
| 3 | Peptizing Agent | 0.50–2.0% | 1.10 |
| | (Total) | (100.00) | (100.00) |

Characteristically, Composition C preferably has a viscosity that is believed to be in the range of about 80,000 to about 90,000 cps measured at 25° C. with a Brookfield viscometer operating with a No. 4 spindle at a spindle speed of 20 rpm. Characteristically also, Composition C is a thixotropic gel.

(d) Preferred Blending Procedures

Compositions A, B and C are usable in various combinations to prepare disperse phase compositions which are then broken up under mixing shear force to form disperse phase bodies in a continuous phase comprised of a diluted Composition C.

Figure 1:
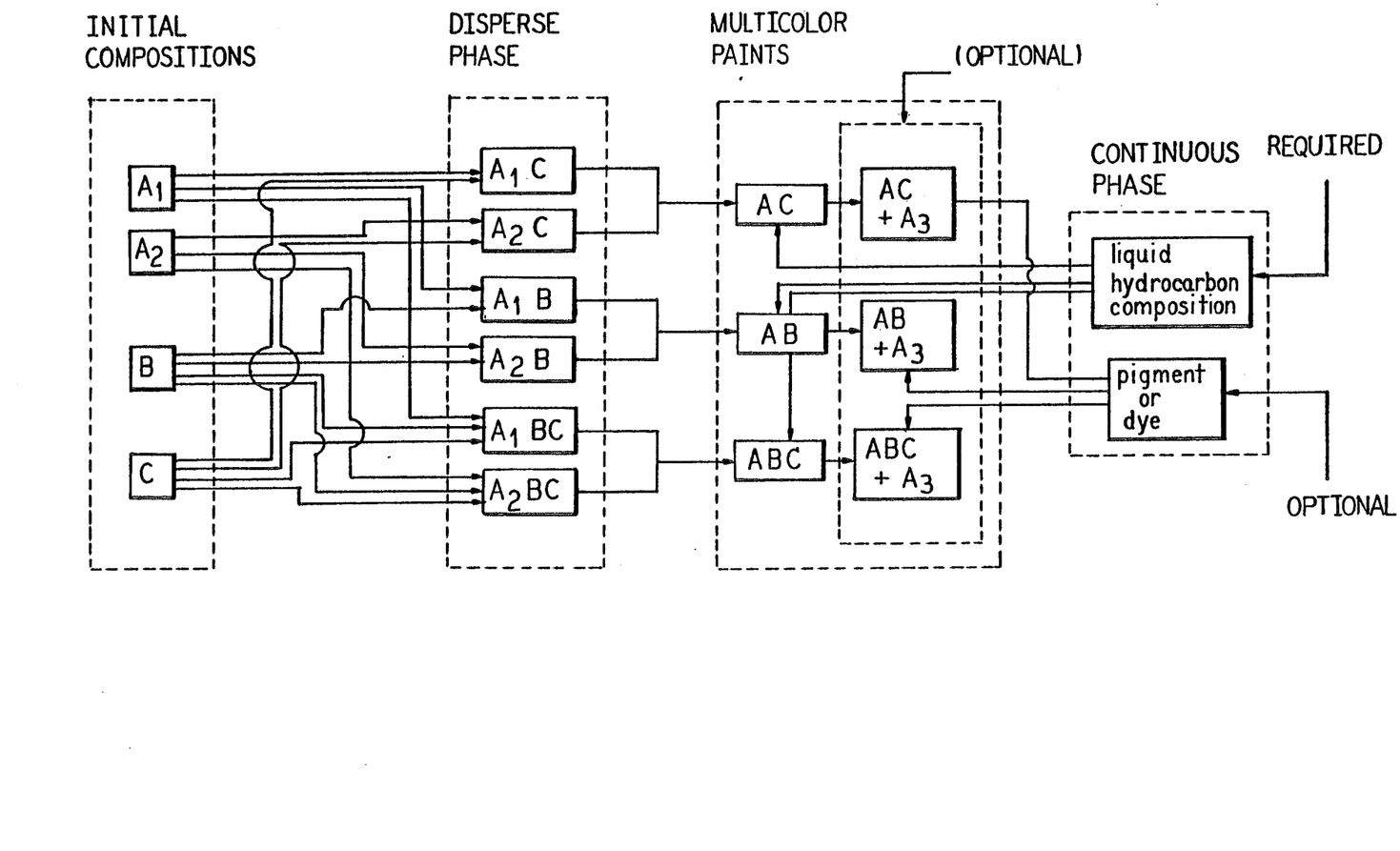

Referring to the flow sheet in the appended drawing, which is submitted to be self-explanatory, it is seen that a Composition A is blended with either Composition B or Composition C, and preferably with both Compositions B and C, to prepare a disperse phase composition which is homogeneous. The preferred weight ratios of Composition A to Compositions B and/or C, as the case may be, and also the preferred viscosities of the resulting disperse phase blend homogeneous compositions, are as shown in Table V below:

TABLE V
DISPERSE PHASE COMPOSITIONS

| I.D. No. | Disperse Phase Composition of | Preferred Approx. Weight Ratio of Composition A to Other Composition(s) (B or B + C) | Preferred Approx. Viscosity Range (CPS) of Blended Disperse Phase Composition[1] |
|---|---|---|---|
| 1 | A + B | 85:15 to 80:20 | 25,000–27,500 |
| 2 | A + C | 85:15 to 80:20 | 30,000–33,000 |
| 3 | A + B + C | 70:15:15 to 80:10:10 | at least 35,000[2] |

Table V footnotes
[1] All viscosities are measured in centipoises at 25° C. with a Brookfield viscometer using a No. 4 spindle operating at 25° C.
[2] More preferably, this viscosity is not greater than about 85,000 centipoises (so measured).

The disperse phase compositions are conveniently prepared using simple mechanical blending procedures and conventional mixing apparatus with the amount of mixing shear force used being at least sufficient to produce a uniform and homogeneous product blend. As shown in Table V, the viscosity of a resulting disperse phase composition appears to be characteristically greater than that of the Composition A that is incorporated therein.

As indicated, preferred disperse phase compositions incorporate all three of the Compositions A, B and C. While such an (A+B+C) composition can be prepared by any convenient procedure, such as by first blending together Compositions A and B or Compositions A and C, and then further blending with the resulting blend a third Composition (either Composition C or B, as the case may be), it is presently preferred to first mix together Composition A and C in a weight ratio within the range shown in Table V and then thereafter to mix Composition B therewith using a weight ratio sufficient to achieve a mixing weight ratio as shown in Table V for all three of such Compositions A, B and C.

An (A+B+C) composition characteristically appears to have a viscosity that is greater than either an (A+B) composition or an (A+C) composition. It is theorized, and there is no intent herein to be bound by theory, that the reason for such increase is that the cationic quaternized cellulose ether has reacted in some now unknown manner with at least one component present in the (A+B+C) composition, perhaps the carboxylated cross-linkable polymer. An (A+B+C) composition, particularly one prepared by the above indicated preferred procedure, appears to have better tack and elasticity characteristics than other such disperse phase compositions.

The (A+B), (A+C) and (A+B+C) disperse phase compositions of the present invention all appear to be novel over all known prior art teachings pertaining to multicolor aqueous disperse phase compositions, and to have higher viscosities than any previously known aqueous pigmentable composition of the type usable for the disperse phase in multicolor paints.

(e) The Hydrocarbon Composition

As indicated, a film-forming, hydrocarbon dispersable, preferably substantially water insoluble or dispersable, preferably carboxylic polymer-compatible polymer is dispersed in a liquid hydrocarbon. Examples of suitable polymers include:
1) polyisobutyl methacrylate;
2) polyethyl methacrylate;
3) polybutyl methacrylate;
4) polystyrene;
5) rosin and rosin derivatives;
6) phenolic resins;
7) epoxy;
8) polyvinylchloride;
9) oil modified alkyds;
10) resin modified alkyds;
11) alkyds modified with oil-based copolymers;
12) oil modified polyurethanes;
13) styrene/butadiene copolymers;
14) vinyl toluene/butadiene copolymers;
15) styrene/acrylate copolymers;
16) vinyl toluene/acrylate copolymers;
17) vinyl toluene/acrylate terpolymers;
mixtures thereof; and the like.

Presently preferred polymers are styrene/acrylate copolymers; styrene/butadiene copolymers; vinyl toluene/acrylate copolymers and vinyl toluene/acrylate terpolymers.

The amount of such polymer can preferably be in the range of about 2 to about 20 weight percent on a total continuous phase composition basis.

Some of such polymers have a greater impact on resulting composition viscosity than others, evidently because of molecular weight and molecular structure. For purposes of retaining disperse phase bodies of a product multicolor paint in suspension for purposes of even short term storage and atomizization as an aerosol when a paint is formulated with a propellant as taught herein, the liquid hydrocarbon carbon composition should have a viscosity of at least about 1500 cps as measured with a Brookfield viscometer at 25° C. with a No. 4 spindle operating at 20 rpm. In order to achieve such a viscosity, if it is not already achieved by the presence of the dispersed film-forming polymer, one can incorporate a thickener with the hydrocarbon composition in an amount at least sufficient to produce the desired viscosity. Usually the viscosity of a hydrocarbon composition is below about 9000 cps similarly measured. Preferably, the viscosity is in the range of about 5000 to about 7000, so measured.

Conventional thickeners which are hydrocarbon dispersable can be employed. Examples of suitable thickeners include:
1 fumed silica;
2) hydroxyethyl cellulose;
3) hydroxypropyl cellulose;
4) carboxy methyl cellulose;
5) smectite clay;

6) hectorite clay;
7) synthetic hectorite type clay;
8) alkali-soluble emulsions of acrylic polymers, containing acidic pendant functional groups;

mixtures thereof, and the like. Presently preferred thickeners are smectite clays.

Optionally, but preferably, a wax is additionally incorporated into the hydrocarbon liquid which wax is hydrocarbon dispersable. Examples of suitable waxes include:

(A) Naturally occurring, such as
  a) amber wax (melting point 185° F.),
  b) ceresin white,
  c) montan, and
  d) paraffin (melting point 130° F.);
(B) Synthetically produced, such as
  a) ACRAWAX C (a trademark of Glyco, Inc. for a brand of high melting, high flash point wax which is reportedly an imido wax compound),
  b) CASTORWAX (a trademark of Baker Castor Oil Company for hydrogenated castor oil (the triglyceride of 12-hydroxystearic acid),
  c) SANTOWAX M (a trademark of Monsanto Company for a waxy composition of mixed terphenyls), and
  d) chlorinated paraffin wax; and
(C) Produced by animal or vegetable, such as
  a) beeswax,
  b) candelilla,
  c) carnauba,
  d) Japan, and
  e) spermaceti;

mixtures thereof; and the like.

Presently preferred waxes are chlorinated paraffins particularly because such materials provide useful plasticizing properties.

Conventional paint additives such as above indicated can be incorporated into the hydrocarbon liquid phase composition, if desired.

The presently preferred compositional characteristics for the hydrocarbon liquid phase are shown in the following Table VI:

TABLE VI

PREFERRED HYDROCARBON LIQUID PHASE COMPOSITIONS

| ID # | Component | Weight Percent (100% Basis) Preferred | Presently Most Preferred |
|---|---|---|---|
| 1 | Liquid Hydrocarbon | 68-96 | 89-91 |
| 2 | Wax | 0-1.5 | 0.5-1.0 |
| 3 | Thickener | 0.5-5 | 3 |
| 4 | Film-Forming Polymer | 2-20 | 2-10 |
| 5 | Pigment | 0-10 | 1-10 |
|  | (TOTAL) | (100.00) | (100.00) |

(f) Preparation of Multicolor Paint

At least two different (A+B), (A+C) and/or the preferred (A+B+C) aqueous compositions (each prepared as above described) are used in combination with a hydrocarbon liquid phase composition (prepared as above described) to make a multicolor water-in-liquid hydrocarbon multicolor paint of the invention by the following procedure.

First, at least two different aqueous (A+B), (A+C) or (A+B+C) compositions are each prepared, each preferably being made by the same procedure, but having a different color, so that each resulting (A+B), (A+C) and/or (A+B+C) composition has a different apparent color. Preferably all such compositions for use in any given multicolor paint are of the same type, that is, (A+B), (A+C) or (A+B+C).

Next, the plurality of different (A+B), (A+C) or (A+B+C) compositions are blended together with a liquid hydrocarbon composition. The blending can take place in any order or manner of mixing desired. The result is that the (A+B), (A+C) and/or (A+B+C) compositions break up and form a discontinuous phase in the hydrocarbon composition as the continuous phase. The shear force used for the blending is inversely proportional to the size of the disperse bodies forming the discontinuous phase. The discontinuous phase bodies are characterized by unusual and surprisingly greater structural integrity compared to the structural integrity of prior art discontinuous phase bodies, such as are disclosed, for example, in the above referenced Grasko U.S. Pat. No. 3,370,024. The resulting dispersion constitutes a water-in-liquid hydrocarbon multicolor paint according to this invention.

In general, in a product paint, the viscosity of each of the disperse phase compositions should preferably be in the range of about 25,000 to about 85,000 cps. The viscosity of the continuous phase is preferably in the range of about 5,000 to about 7,000 cps. The viscosity ratio range of the disperse phase to the continuous phase comparably measured is preferably about 5:1 to about 12:1 for each gel composition employed (that is, the (A+B), (A+C) or (A+B+C) gel compositions employed in such a product paint).

The respective amounts of the individual aqueous (A+B), (A+C) and (A+B+C) compositions employed in a given multicolor paint can be varied according to the preference of the formulator. Preferably, the weight ratio of the total weight of all (A+B), (A+C) and/or (A+B+C) compositions employed in a given multicolor paint of this invention to the weight of the hydrocarbon liquid composition employed in the paint is in the range of about 1:1 to about 4:6, although larger and smaller such weight ratios can be used, if desired.

In a product multicolor paint of this invention, the viscosity differences between the discontinuous phase compositions and the continuous phase compositions, and the total weight ratio of the weight of the total discontinuous phase compositions to the weight of the continuous phase composition are desirable because those amounts result in production of a product paint wherein the disperse phase bodies form and remain suspended and discrete during subsequent paint storage.

Various mixing procedures can be employed. When, for example, a multicolor paint of this invention is prepared wherein the discontinuous phase color bodies are to have different sizes, one can prepare the different sized discontinuous phase bodies in separate mixing operations with different hydrocarbon liquid composition batches. Thereafter, the different and separately so prepared continuous/discontinuous dispersions compositions can be blended together. Preferably, a mixing shear force is used which is not larger than that used to make the largest size disperse phase bodies desired in the resulting mixed dispersions.

Study of the (A+B), (A+C) and (A+B+C) compositions indicates that each is a gel and remains a gel when formed into disperse phase bodies in a multicolor paint composition of the invention. The gel bodies formed from (A+B+C) compositions are believed to have the greatest internal structural integrity or strength.

Once the (A+B), (A+C) and (A+B+C) compositions are broken up by mixing, the resulting disperse phase bodies apparently cannot and do not coalesce together again to reconstruct the respective original (A+B), (A+C) and/or (A+B+C) compositions. Apparently, the disperse phase particles or bodies each have a crosslinked surface and internal structure, and also an interfacial bonding relationship between the continuous phase and the discontinuous phase bodies. No discrete interfacial material layer, such as a shell wall or the like, is believed to exist between the disperse phase bodies and the continuous phase.

Typically, the disperse phase body particle sizes in a multicolor paint of this invention have a size in the range of about 0.2 to about 15 mm, but larger and smaller body or particle sizes can be employed, if desired.

The multicolor paint compositions of this invention are characteristically indefinitely storage stable, including shelf, shipping, thermal, and vibrational (mixing) aspects.

The excellent strength and stability characteristics of a multicolored paint composition of this invention are demonstrated by the circumstance that such a composition is characteristically sprayable by airless spraying procedures, where high shear forces are characteristically exerted upon the formulation being so sprayed, without disperse phase color body breakdown.

While a multicolor paint formulation of this invention characteristically contains at least two distinct colors, those skilled in the art will appreciate that a particular multicolor paint formulation may contain many different classes of distinctly separately colored disperse phase bodies, perhaps six or more, each individual identically colored group of discrete disperse phase bodies having been separately and preliminarily prepared as an (A+B), (A+C) or (A+B+C) disperse phase composition as hereinabove described, before the disperse phase composition is blended into the continuous phase. Various ratios and proportions of respective (A+B), (A+C) and (A+B+C) compositions relative to one another can be used in blending, as indicated above.

An optional but preferred component of a multicolor paint of this invention is a neutralizer which is used for reasons of pH control and buffering. Examples of suitable neutralizers include potassium hydroxide, ammonium hydroxide, triethanolamine, dimethylethanol amine, mixtures thereof, and the like. The amount of neutralizer used can range from greater than 0 up to about 0.6 weight percent on a 100 weight percent total paint composition basis. The neutralizer, when used, can be added at any convenient point in the blending sequence; for example, the neutralizer can be added to Composition A or to the final mixture of gel phase composition and continuous phase at the time when such are being blended together. The neutralizer can be preliminarily prepared as an aqueous solution or dispersion for ease in blending.

The compositional characteristics for a preferred class of multicolor paint compositions of this invention are summarized in the following Table VII:

TABLE VII

PREFERRED WATER-IN-LIQUID HYDROCARBON PAINT

| ID# | Component | Weight Percent (100% Basis) Broad Range | Preferred |
|---|---|---|---|
| 1 | Total Disperse Phase Bodies from all aqueous (A + B) (A + C), (A + C) and/or (A + B + C) compositions | 30–70 | 40–60 |
| 2 | Hydrocarbon Composition | 70–30 | 60–40 |
| | (Total) | (100.00) | (100.00) |

It will be appreciated that a multicolor paint of the present invention can generally be applied by any conventional application method desired, utilizing spraying, brushing, roller, pad, or the like, with care being taken to avoid disperse phase particle alteration.

A presently most preferred water-in-liquid hydrocarbon multicolor paint of this invention is shown in the following Table VIII:

TABLE VIII

MOST PREFERRED EMBODIMENT

| Aliphatic hydrocarbon | 42.65 |
|---|---|
| Smectite clay | 1.68 |
| Chlorinated paraffin | .90 |
| Film-forming component | 1.93 |
| Aromatic hydrocarbon | 1.95 |
| Wax | .34 |
| Water | 35.33 |
| Wetting agent | .18 |
| Anti-foaming agent | .07 |
| Hydroxyethyl cellulose | .34 |
| Carboxylated styrene acrylate | 4.99 |
| Monomeric plasticizer | .50 |
| Pigment | 3.50 |
| Cationic quaternized cellulose ether | .15 |
| Hectorite clay | .71 |
| Peptizing agent | .08 |
| Organofunctional silane | 1.00 |
| Crosslinker | 1.00 |
| Water miscible cosolvents | 2.70 |
| (Total Weight Percent) | (100.00) |

(g) Sprayable Aerosol-Type Multicolor Paint Compositions

To prepare a sprayable aerosol composition of this invention, a multicolor paint such as described in the presiding Section (f) (above) is combined (i.e. mixed) with a propellant, such as above characterized. Preferably, the combining is accomplished into a conventional container that is already, or is thereafter, valve-equipped for aerosol subsequent spray use. Conventional aerosol container filling procedures known to the art can be used.

The aerosol valve used with the aerosol container is preferably (a) spring biased in a normally closed configuration, (b) provided with manually operable means for opening, and (c) reclosable after being opened. Such valves are known to the art.

On a 100 weight percent basis, the resulting sprayable composition in the resulting sealed aerosol container typically contains about 60 to about 90 weight percent of the multicolor paint composition, and, correspondingly, about 10 to about 40 weight percent of propellant. The propellant dissolves in the continuous phase and remains dissolved under the autogenous conditions that exist in the container. Thus, the aerosol container does not need to have separate compartments for each of the multicolor paint and the propellant that are separated from one another by a diaphragm or the like.

The resulting aerosol-type multicolor sprayable paint composition is found to be storage stable for indefinite periods of time before use (spraying).

Presently preferred sprayable aerosol paints of this invention are those adapted for use (because of the colors used) in the automotive and truck fields for the spraying of trunk interiors and the like.

Presently preferred water-in-liquid hydrocarbon aerosol paints are summarized in Table IX below.

TABLE IX
PREFERRED WATER-IN-LIQUID HYDROCARBON AEROSOL PAINT

| ID# | Component | Weight Percent (100% Basis) Broad Range | Weight Percent (100% Basis) Presently Most Preferred |
|---|---|---|---|
| 1 | Disperse Base Bodies (from aqueous (A + B) (A + C), (A + C) or (A + B + C) compositions | 30–60 | 40.00 |
| 2 | Continuous Phase (from Hydrocarbon Liquid Composition) | 10–55 | 40.00 |
| 3 | Propellant | 15–30 | 20.00 |
|  | (Total) | (100.00) | (100.00) |

(h) Coatings

Whether or not preliminarily formulated with a propellant and then applied as an aerosol to produce a coating, a multicolor water-in-liquid hydrocarbon paint of this invention that is applied as a layer over a solid surface and dried (as in air) produces a product coating that is characteristically highly water resistant.

Indeed, this water resistance can be about equal to, or even better than, the water-resistance of the clear overcoatings described in the prior art for use in overcoating a prior art multicolor paint, such as the overcoating comprised of nitrocellulose, acrylic polymer or the like.

As an applied paint coating dries on a surface, the film-forming carboxylated polymer in combination with other polymers present form a continuous film or coating in which the disperse phase bodies become located typically in a matrix derived from the continuous phase. Both the water and the organic solvent or carrier liquids evaporate, and the resulting coating becomes crosslinked.

In addition to water resistance, a product dried coating displays an excellent combination of properties including abrasion (wear) resistance, thermal stability, washability, surface smoothness, and the like.

The invention is further illustrated by the following examples.

EXAMPLES 1 AND 2

Preparation of First and Second "Composition A"

Two embodiments of "Composition A" are prepared by blending together the following components in the respective amounts indicated using a Cowles blade operating at about 450 to about 1500 rpm in a mixer:

| FIRST & SECOND "COMPOSITION A" | Ex. 1 | Ex. 2 |
|---|---|---|
| Water | 42.02 | 42.02 |
| Wetting agent (Tamol 165) | .50 | .50 |
| Antifoaming agent (Nopco NXZ) | .20 | .20 |
| Hydroxyethyl cellulose (Cellosize QP-100-MH) | 1.00 | 1.00 |
| Titanium Dioxide (Dupont R-900) | 10.00 | — |
| Bone Black (Ebonex 3D) | — | 8.20 |
| Barium Sulfate (Barytes) | — | 1.80 |
| Carboxylated Styrene Acrylate Copolymer (Pliolite 7103) | 33.33 | 33.33 |
| Butyl Benzyl Phthalate (Santicizer 160) | 1.50 | 1.50 |
| Organo Functional Silane (A-187) | .20 | .20 |
| Ester Alcohol (Texanol) | 1.25 | 1.25 |
| Ethylene Glycol Butyl Ether (Butyl Cellosolve) | 3.50 | 3.50 |
| Carbodiimide (UCARLINK XL-25-SE) | 6.00 | 6.00 |
| Ammonium Hydroxide (28% Ammonia) | .50 | .50 |
| (Total Weight Percent) | (100.00) | (100.00) |

The "Composition A" of Example 1 has a white color and its Brookfield viscosity is about 20,000 cps measured at 25° C. using a No. 4 spindle operating at 20 rpm, and the "Composition B" of Example 2 has a black color and its Brookfield viscosity is about 25,000 cps similarly measured.

EXAMPLE 3

Preparation of "Composition B"

A "Composition B" is prepared by blending together the following components in the respective amounts indicated using a Cowles blade operating at about 1000 to about 2500 rpm in a mixer:

| | |
|---|---|
| Water | 98.00 |
| Cationic quaternized cellulose ether Polyquaternium-10 (UCARE Polymer JR-30) | 2.00 |
| (Total Weight Percent) | (100.00) |

The Brookfield viscosity of the resulting "Composition B" is about 50,000 cps measured at 25° C. using a No. 4 spindle operating at 20 rpm.

EXAMPLE 4

Preparation of "Composition C"

A "Composition C" is prepared by blending together the following components in the respective amounts indicated using a Cowles blade operating at about 750 to about 2000 rpm in a mixer:

| | |
|---|---|
| Water | 89.40 |
| Synthetic sodium magnesium lithium hectorite clay (Laponite RDS) | 9.50 |
| Peptizing agent (tetrasodium pyrophosphate) | 1.10 |
| (Total Weight Percent) | (100.00) |

The Brookfield viscosity of the resulting "Composition C" is about 85,000 cps measured at 25° C. using a No. 4 spindle operating at 20 rpm.

EXAMPLE 5

Preparation of First Disperse Phase Gel Composition

A first disperse phase gel composition is prepared by blending together the following indicated amounts of each of Examples 1 and 3 using a Cowles blade operating at about 800 to 1500 rpm in a mixer:

| | |
|---|---|
| "Composition A" Example 1 (white) | 82.40 |
| "Composition B" Example 3 | 17.60 |
| (Total Weight Percent) | (100.00) |

The Brookfield viscosity of the resulting gel composition is about 26,000 cps measured at 25° C. using a No. 4 spindle operating at 20 rpm.

EXAMPLE 6

Preparation of First Disperse Phase Gel Composition

A first disperse phase gel composition is prepared by blending together the following indicated amounts of each Examples 1 and 4 using a Cowles blade operating at about 1000 to about 2000 rpm in a mixer:

| | |
|---|---|
| "Composition A" Example 1 (white) | 82.40 |
| "Composition C" Example 4 | 17.60 |
| (Total Weight Percent) | (100.00) |

The Brookfield viscosity of the resulting gel composition is about 31,000 cps measured at 25° C. using a No. 4 spindle operating at 20 rpm.

EXAMPLE 7

Preparation of First Disperse Phase Gel Composition

A first disperse phase gel composition is prepared by blending together the following indicated amounts of each Examples 1, 3 and 4 using a Cowles blade operating at about 1000 to about 2500 rpm in a mixer:

| | |
|---|---|
| "Composition A" Example 1 (white) | 70.00 |
| "Composition B" Example 3 | 15.00 |
| "Composition C" Example 4 | 15.00 |
| (Total Weight Percent) | (100.00) |

The Brookfield viscosity of the resulting gel composition is about 35,000 cps measured at 25° C. using a No. 4 spindle operating at 20 rpm.

EXAMPLE 8

Preparation of Second Disperse Phase Gel Composition

A second disperse phase gel composition is prepared by blending together the following indicated amounts of each Examples 2 and 3 using a Cowles blade operating at about 800 to about 1500 rpm in a mixer:

| | |
|---|---|
| "Composition A" Example 2 (black) | 82.40 |
| "Composition B" Example 3 | 17.60 |
| (Total Weight Percent) | (100.00) |

The Brookfield viscosity of the resulting gel composition is about 29,500 cps measured at 25° C. using a No. 4 spindle operating at 20 rpm.

EXAMPLE 9

Preparation of Second Disperse Phase Gel Composition

A second disperse phase gel composition is prepared by blending together the following indicated amounts of each Examples 2 and 4 using a Cowles blade operating at about 1000 to about 2000 rpm in a mixer:

| | |
|---|---|
| "Composition A" Example 2 (black) | 82.40 |
| "Composition C" Example 4 | 17.60 |
| (Total Weight Percent) | (100.00) |

The Brookfield viscosity of the resulting gel composition is about 32,000 cps measured at 25° C. using a No. 4 spindle operating at 20 rpm.

EXAMPLE 10

Preparation of Second Disperse Phase Gel Composition

A second disperse phase gel composition is prepared by blending together the following indicated amounts of each Examples 2, 3 and 4 using a Cowles blade operating at about 1000 to about 2500 rpm in a mixer:

| | |
|---|---|
| "Composition A" Example 2 (black) | 70.00 |
| "Composition B" Example 3 | 15.00 |
| "Composition C" Example 4 | 15.00 |
| (Total Weight Percent) | (100.00) |

The Brookfield viscosity of the resulting gel composition is about 37,500 cps measured at 25° C. using a No. 4 spindle operating at 20 rpm.

Example 11

Preparation of Hydrocarbon Liquid Composition

A hydrocarbon liquid composition is prepared by blending together the following components in the respective amounts indicated in a mixer using a Cowles blade operating at about 500 to about 1500 rpm.

| | |
|---|---|
| Aliphatic hydrocarbon (VMtP Naphtha Rule 66) | 85.50 |
| Smectite clay (Bentone 38) | 3.1 |
| Chlorinated paraffin (CW 170) | 1.8 |
| Film-forming component | |
| Vinyl toluene/butadiene copolymer (Pliolite VT) | 3.7 |
| Aromatic hydrocarbon (Tolvol) | 4.1 |
| Alcohol (methyl alcohol) | 1.2 |
| Wax (white fonolin, petrolatum) | .6 |
| (Total Weight Percent) | (100.00) |

The product liquid composition has a Brookfield viscosity of about 5000 to about 7000 cps measured at 25° C. using a No. 4 spindle operating at 20 rpm.

EXAMPLE 12

Preparation of Water-in-Liquid Hydrocarbon Multicolor Paint

To the liquid hydrocarbon composition of Example 11 is added the first disperse phase gel composition of Example 5 and the second disperse phase gel composition of Example 8 which mixture is subjected to mixing by a Cowles blade operating at about 500 to about 750 rpm in a mixer. The product blend has a continuous phase comprised of the composition of Example 11 and a discontinuous phase comprised of disperse phase bodies derived form the respective gel compositions of Examples 5 and 8. The disperse phase bodies have particle sizes believed to be in the range of about 1 to about 5 millimeters. The product blend is thus a black and white multicolor paint whose composition is as follows:

| | |
|---|---|
| Liquid hydrocarbon composition of Example 1 | 50.00 |

-continued

| | |
|---|---|
| First phase gel composition of Example 5 (white) | 25.00 |
| Second phase gel composition of Examples 8 (black) | 25.00 |
| (Total Weight Percent) | (100.00) |

The paint has a viscosity of about 5,000 to about 7,500 cps measured with a Brookfield viscometer at 25° C. with a No. 4 spindle operating at 20 rpm. When this paint is applied with a brush to a surface and then dried, the coating is found to have water resistance since the coating passes ASTM test No. D-1308-79.

EXAMPLE 13

Aerosol Paint Preparation

About 296 grams of paint of Example 12 are placed in a 16 ounce valved aerosol container and charged with propellant to produce the following composition in the can:

| | |
|---|---|
| Paint of Example 12 | 80.00 |
| Propellant | 20.00 |
| (Total Weight Percent) | (100.00) |

The propellant used is A70 (above identified). This formulation has a Stormer viscosity of 78–85 KU measured at 25° C. The valve used is obtained from Newman Green as "110-55-32"; thus, the exterior orifice is 32 thousandths inch, and the interior orifice is 55 thousandths inch.

When applied as a aerosol spray and dried, the coating is found to have water resistance since the coating passes ASTM test No. D-1308-79.

EXAMPLE 14

Preparation of Water-in-Liquid Hydrocarbon Multicolor Paint

The procedure of Example 12 is repeated except that the first disperse phase gel of Example 6 and the second disperse phase gel of Example 9 are used. This paint has a viscosity of about 5,000 to about 7,500 cps under the measuring conditions described above. When applied as in Example 12, similar properties are observed.

EXAMPLE 15

Preparation of Aerosol Paint

The procedure of Example 13 is repeated using the paint of Example 14. When applied as in Example 13, similar properties are observed.

EXAMPLE 16

Preparation of Water-in-Liquid Hydrocarbon Multicolor Paint

The procedure of Example 12 is repeated except that the first disperse phase gel of Example 7 and the second disperse phase gel of Example 10 are used.

The paint has viscosity of about 5,000 to about 7,500 cps under the foregoing measuring conditions. When applied as in Example 12, similar properties are observed.

EXAMPLE 17

Preparation of Aerosol Paint

The procedure of Example 13 is repeated using the paint of Example 16. When applied as in Example 13, similar properties are observed.

EXAMPLE 18

A 16 ounce aerosol can fitted with the valve described in Example 13 is charged with:

| | |
|---|---|
| 148 grams | of the Example 11 liquid composition |
| 148 grams | of equal parts of a mixture of Ex. 5, Ex. 6, Ex. 7, Ex. 8, Ex. 9 and Ex. 10 |
| 74 grams | Propellant A-70 |
| 370 grams | |

The resulting composition is sprayed from the aerosol can. Drying time at ambient temperature, and 50 percent relative humidity, coating will dry to a tack free film is one hour. Maximum film properties are attainable after additional post curing, 96 hours.

When the coating is fully cured, it passes ASTM D-1308-79 Spot test, both opened and covered. Excellent water resistance occurs. A clear topcoat is not needed in this aerosol multicolor application. The drying time can be accelerated by force drying at about 125°–150° F.

EXAMPLES 19–23

Other Hydrocarbon Compositions

Additional hydrocarbon compositions are prepared using the procedure of Example 11, but by substituting the indicated components shown in the following Table X in the appropriate amounts.

TABLE X

HYDROCARBON COMPOSITIONS

| Ex. No. | Liquid Hydrocarbon Type (Chem. Struct.) | Wt %[1] | Wax Type (Chem. Struct.) | Wt %[1] | Thickener Type (Chem. Struct.) | Wt %[1] |
|---|---|---|---|---|---|---|
| Example 19 | Textile Spirits Aliphatic H.C. | 85 | Paraffin M.P. 130° F. | .50 | Fumed Silica Cabosil M-5 | 4.0 |
| Example 20 | Lactol Spirits Aliphatic H.C. | 85 | ACRAWAX C Imido Wax Compound | .50 | Hectorite Clay Mecaloid | 6.0 |
| Example 21 | 140 Flash Solvent Rule 663 Aliphatic H.C. | 85 | SANTOWAX M (Terphenyls) | .50 | Synthetic Hectorite Clay Laponite RD | 6.0 |
| Example 22 | Colorless Mineral Sprts Xylene | 68 17 | Carnauba | .50 | Smectite Clay Bentone 38 | 3.0 |
| Example 23 | Colorless Mineral Sprts Toluene | 64 21 | CASTORWAX | .50 | Synthetic Hectorite Clay Laponite RDS | 6.0 |

| Ex. No. | Film-Forming Polymer Type (Chem. Struct.) | Wt %[1] | Pigment Type (Chem. Struct.) | Wt %[1] | Additive Package | Wt %[1] |
|---|---|---|---|---|---|---|
| Example 19 | Styrene/Acrylate Copolymer | 4.0 | Oil Black | .50 | Toluene | 5.0 |

TABLE X-continued

HYDROCARBON COMPOSITIONS

| | | | | | | |
|---|---|---|---|---|---|---|
| | Pliolite AC | | Dye IBMS | | Methyl Alcohol | 1.0 |
| Example 20 | Styrene/Butadiene Copolymer | 4.0 | Oil Red | .50 | Toluene | 3.0 |
| | Pliolite S-5 | | Dye 7NB | | Methyl Alcohol | 1.0 |
| Example 21 | Vinyltoluene/Acrylate Copolymer | 4.0 | Titanium | 1.00 | Toluene | 2.7 |
| | Pliolite VTAC | | Dioxide R-900 | | Methyl Alcohol | .8 |
| Example 22 | Vinyltoluene/Acrylate Terpolymer | 4.0 | Carbon Black | .50 | Toluene | 5.0 |
| | Pliolite CMS | | Raven 3500 | | Methyl Alcohol | 2.0 |
| Example 23 | Vinyl Acrylate Terpolymer | 4.0 | Aluminum Pesta | 1.00 | Toluene | 2.7 |
| | Plioway EC-L | | ALCAN 587 | | Methyl Alcohol | .8 |

Table X Footnote:
(1) All weight percentages are expressed on a 100 wt percent total hydrocarbon composition basis.

In Table X, each component of each composition is expressed on a 100 weight percent total composition basis. Also, the "additive package" employed in each Example comprises conventional additives which are commonly used in paint formulating. The "additive package" is then charged to each exemplary composition in the quantity indicated in Table X.

EXAMPLES 24-27

Other Embodiments of Multicolor Paints

In place of the carboxylated styrene acrylate polymer employed in Examples 1 and 4, a different water soluble, film-forming, crosslinkable carboxylated polymer is employed in different respective compositions A which are each prepared by the procedure of Examples 1 and 4. Each polymer and the respective amount of each is shown in the following Table XI:

TABLE XI

WATER-IN-LIQUID HYDROCARBON MULTICOLOR PAINTS

| | Carboxylated Polymer | | First Disperse Phase Gel | | Second Disperse Phase Gel | | Hydrocarbon Composition | |
|---|---|---|---|---|---|---|---|---|
| Ex. No. | Identity | Wt. % (1) | Prep. Ex. No. | Wt. % (2) | Prep. Ex. No. | Wt. % (2) | Prep. Ex. No. | Wt. % (3) |
| 24 | Acrylic Hydrocarbon 26171 | 37.5 | Example 7 | 25 | Example 10 | 25 | Example 19 | 50 |
| 25 | Vinylidene Copolymer Geon 450x61 | 24.59 | Example 5 | 30 | Example 8 | 30 | Example 20 | 40 |
| 26 | Styrene Butadiene Goodrite 2570x59 | 25.42 | Example 6 | 20 | Example 9 | 20 | Example 21 | 60 |
| 27 | Vinyl Chloride Geon 460x45 | 33.33 | Example 7 | 25 | Example 10 | 25 | Example 23 | 50 |

Table XI Footnotes
(1) This weight percentage is expressed as the weight percent of carboxylated polymer present in a Composition A prepared as described in Example 1.
(2) This weight percentage is expressed as the quantity of such gel present as disperse phase bodies in a product multicolor paint.
(3) This weight percentage is expressed as the amount of such hydrocarbon composition present in a product multicolor paint.

Then, each resulting "Composition A" is next employed in the respective procedures of Examples 7 and 10 to produce the respective first and second disperse phase gel compositions.

Finally, each of the first and second disperse phase gel compositions is blended with a hydrocarbon composition selected from among the compositions of Examples 16-20 using the procedure of Example 14 to produce a multicolor paint. The identity and respective amounts of each gel composition and each of the hydrocarbon compositions in each multicolor paint is shown in Table XI.

Each of the resulting paints, when applied as in Example 15, display desired dried coatings with qualities that are comparable, including water resistance.

While the foregoing description makes use of illustrative examples of various types, no limitations upon the present invention are to be implied or inferred therefrom.

What is claimed is:

1. A method for making a multicolor water-in-liquid hydrocarbon paint comprising the steps of:
   (A) providing a first composition comprising on a 100 weight percent basis:
      (a) about 10 to about 40 weight percent dissolved, water dispersable, film-forming, crosslinkable, carboxylated polymer,
      (b) about 0.5 to about 2 weight percent dissolved hydroxy (lower alkyl) cellulose,
      (c) about 0.5 to about 10 weight percent dissolved crosslinking agent selected from the group consisting of polyfunctional aziridines and multifunctional carbodiimides,
      (d) from and including 0 to about 30 weight percent dispersed pigment,
      (e) from and including 0 to about 10 weight percent organic cosolvent, and
      (f) about 44.4 to about 65.8 weight percent water;
   (B) providing a second composition comprising on a 100 weight percent basis:
      (a) about 0.5 to about 5 weight percent dissolved cationic quaternized cellulose ether, and
      (b) about 95 to about 99.5 weight percent water;
   (C) providing a third composition comprising on a 100 weight percent basis:
      (a) about 0.5 to about 2 weight percent dissolved peptizing agent,
      (b) about 5 to about 10 weight percent dispersed water swellable clay, and
      (c) about 88 to about 95 weight percent water;

(D) blending said first composition with a composition selected from the group consisting of:
   (a) said second composition in the weight ratio range of about 85:15 to about 80:20 of said first composition to said second composition,
   (b) said third composition in the weight ratio range of about 85:15 to about 80:20 of said first composition to said third composition, and
   (c) a combination of said second composition and said third composition in the weight ratio range of about 70:15:15 to about 80:10:10 of said first composition to said second composition to said third composition so as to produce a first disperse phase gel composition having a viscosity in the range of about 25,000 to about 85,000 centipoises;

(E) mixing said first disperse phase gel composition with a continuous uniform hydrocarbon liquid phase composition comprising on a 100 weight percent basis:
   (a) about 2 to about 20 weight percent film-forming polymer,
   (b) about 0.5 to about 5 weight percent thickener,
   (c) about 0 to about 1.5 weight percent wax,
   (d) about 0 to about 10 weight percent pigment, and
   (e) about 68 to about 96 weight percent liquid hydrocarbon and said hydrocarbon liquid phase composition having a viscosity in the range of about 5000 to about 7000 centipoises, the mixing shear force used in said mixing being sufficient to break up said first disperse phase gel composition into discrete gel bodies dispersed in said continuous uniform hydrocarbon liquid phase composition, said mixing shear force being inversely proportional to the average size of said discrete bodies, thereby to produce said multicolor paint.

2. A water-in-liquid hydrocarbon multicolor paint comprising a discontinuous aqueous phase dispersed in a continuous liquid hydrocarbon phase,
   said discontinuous aqueous phase being comprised of a plurality of discrete bodies, such bodies being comprised of a uniform aqueous composition containing in admixture:
   water dispersable, film-forming, crosslinkable carboxylated polymer,
   crosslinking agent selected from the group consisting of multifunctional carbodiimides and polyfunctional aziridines,
   cellulose material selected from the class consisting of hydroxy (lower alkyl) cellulose and alkali metal carboxylated (lower alkyl) cellulose, and
   at least one gel former selected from the class consisting of cationic quaternized ethyl cellulose, and preformed gel comprised of water-swellable clay, peptizing agent and water;
   and said continuous liquid hydrocarbon phase being comprised of a uniform starting material mixture of:
   hydrocarbon liquid dispersable, film-forming polymer and sufficient thickener to produce a continuous liquid phase viscosity of at least about 1500 cps, and
   water immiscible hydrocarbon liquid, the viscosity of said continuous phase being less than the viscosity of said discontinuous phase measured under comparable conditions said paint having been prepared by the process of claim 1.

3. The paint of claim 1 wherein a propellant is additionally dissolved in said continuous liquid hydrocarbon phase.

4. The paint of claim 1 wherein said crosslinkable carboxylated polymer is a carboxylated styrene acrylate copolymer.

5. The paint of claim 1 wherein said crosslinkable polymer is a carboxylated styrene acrylate copolymer, said crosslinking agent is a multi-functional carbodiimide, said clay is a synthetic hectorite, and said peptizing agent is tetrasodium pyrophosphate, both of said gel formers are present, and a least some of the said gel bodies are pigmented.

6. The paint of claim 1 wherein said discontinuous phase includes an organic water miscible cosolvent and the weight ratio of said discontinuous phase to said continuous phase is in the range of about 1:1 to about 4:6.

7. The paint of claim 1 wherein a continuous phase further includes in admixture therewith said wax.

8. The method of claim 1 wherein, in each of said disperse phase gel compositions said crosslinkable polymer is a carboxylated styrene acrylate copolymer, said crosslinking agent is a multifunctional carbodiimide, said clay is a synthetic hectorite, and said peptizing agent is tetrasodium pyrophosphate, both of said gel formers are present, and at least some of said gel bodies are pigmented.

9. The method of claim 1 wherein the weight ratio of the total weight of said disperse phase gel compositions to the weight of said hydrocarbon liquid phase composition is in the range of about 1:1 to about 4:6.

10. A coating produced by applying a continuous layer of a paint of claim 1 to a surface and then drying said so applied layer.

11. A coating produced by applying a continuous layer of a paint of claim 3 to a surface and then drying said so applied layer.

12. An aerosol-dispensing container which includes an aerosol dispensing valve that is (a) spring biased in a normally closed configuration; (b) provided with manually operable means for opening, and (c) reclosable after being opened, said container containing a composition that is dispensable through said valve when opened, said composition being a paint of claim 2.

13. The method of claim 1 wherein in said blending step (D), said first composition is so blended with said combination of said second composition and said third composition to produce said first disperse phase gel composition.

14. The method of claim 1 wherein a second disperse phase gel composition is prepared by said steps (A) through (D), said second disperse phase composition contains a pigment which results in a different coloration for said second disperse phase gel composition relative to said first disperse phase gel composition, and said second disperse phase composition is likewise additionally mixed with said continuous phase composition and broken up into discrete gel bodies using a mixing procedure as taught in said step (E), thereby to produce a multicolor water-in-liquid hydrocarbon paint.

15. The method of claim 13 wherein a plurality of further disperse phase gel compositions is prepared by said steps (A) through (D), each said further disperse phase gel composition containing a pigment which is different from all others of said disperse phase gel compositions, and each of said further disperse phase gel compositions is mixed with said continuous phase composition and broken up into discrete gel bodies using a mixing procedure as taught in said step (E), thereby to produce a multicolor water-in-liquid hydrocarbon paint.

16. A paint of claim 1 wherein said discontinuous aqueous phase is produced by blending in said process step (D), said first composition with said combination of said second composition and said third composition in the weight ratio range of about 70:15:15 to about 80:10:10 of said first composition to said second composition to said third composition.

* * * * *

UNITED STATES PATENT AND TRADEMARK OFFICE
CERTIFICATE OF CORRECTION

PATENT NO. : 5,114,481
DATED : May 19, 1992
INVENTOR(S) : James F. Lynch

It is certified that error appears in the above-identified patent and that said Letters Patent is hereby corrected as shown below:

Col. 5, in Table I the trademark identification of each one of ingredient No.s 2-13 and 18-21, change "Mycar" to --"Hycar"--.

Col. 7, at about line 55, (in formula), change "$R_1=N=C=N-R_2$" to --$R_1-N=C=N-R_2$--.

Col. 9, at about lines 58-59 (in Table II), change "3-50%" to --44-89%--.

Col. 9, at about lines 59-60 (in Table II), change "99%" to --9.9%--.

Col. 26, line 3 (in Claim 3), change "1" to --2--.

Col. 26, line 6 (in Claim 4), change "1" to --2--.

Col. 26, line 9 (in Claim 5), change "1" to --2--.

Col. 26, line 16 (in Claim 6), change "1" to --2--.

Col. 26, line 21 (in Claim 7), change "1" to --2--.

Col. 26, line 23 (in Claim 8), change "1" to --15--.

Col. 26, line 24 (in Claim 8), change "compositions" to --compositions,--.

Col. 26, line 31 (in Claim 9), change "1" to --15--.

UNITED STATES PATENT AND TRADEMARK OFFICE
CERTIFICATE OF CORRECTION

PATENT NO. : 5,114,481
DATED : May 19, 1992
INVENTOR(S) : James F. Lynch

It is certified that error appears in the above-identified patent and that said Letters Patent is hereby corrected as shown below:

Col. 26, line 36 (in Claim 10), change "1" to --2--.

Col. 26, line 39 (in Claim 11), change "3" to --4--.

Col. 26, line 47 (in Claim 12), change "2" to --3--.

Col. 26, line 64 (in Claim 15), change "13" to --14--.

Col. 27, line 7 (in Claim 16), change "1" to --2--.

Signed and Sealed this

Sixteenth Day of November, 1993

Attest:

BRUCE LEHMAN

*Attesting Officer*

*Commissioner of Patents and Trademarks*